United States Patent [19]

Blake

[11] E Re. 29,695

[45] Reissued Jul. 11, 1978

[54] OUTBOARD MOTOR WITH SPEED REGULATOR FOR DC PERMANENT MAGNET MOTOR

[75] Inventor: Charles H. Blake, Sault Sainte Marie, Canada

[73] Assignee: Outboard Marine Corporation, Waukegan, Ill.

[21] Appl. No.: 713,391

[22] Filed: Aug. 11, 1976

Related U.S. Patent Documents

Reissue of:

[64] Patent No.: 3,954,081
Issued: May 4, 1976
Appl. No.: 549,951
Filed: Feb. 14, 1975

U.S. Applications:

[63] Continuation-in-part of Ser. No. 399,609, Sep. 21, 1973, abandoned.

[51] Int. Cl.[2] ..... B63H 21/26
[52] U.S. Cl. ..... 115/18 E; 310/87
[58] Field of Search ..... 115/18 E, 18 R, 17; 310/87, 68; 318/345 B, 139

[56] References Cited

U.S. PATENT DOCUMENTS

| | | | |
|---|---|---|---|
| 2,429,774 | 10/1947 | Schultz et al. | 115/18 E |
| 2,808,238 | 10/1957 | Spitler | 310/87 |
| 2,975,349 | 3/1961 | Green | 318/345 B |
| 3,231,808 | 1/1966 | McDaniel | 318/345 B |
| 3,457,866 | 7/1969 | Komor | 310/87 |
| 3,593,050 | 7/1971 | Ware | 115/18 E X |
| 3,906,887 | 9/1975 | Kappas | 310/87 X |

*Primary Examiner*—Trygve M. Blix
*Assistant Examiner*—Sherman D. Basinger
*Attorney, Agent, or Firm*—Michael, Best & Friedrich

[57] ABSTRACT

Disclosed herein is an outboard motor comprising a shaft extending vertically under normal operating conditions and including a hollow interior, a lower housing fixedly connected to the shaft and including a hollow interior, an electric motor mounted in the housing hollow interior and including an output shaft, a propeller driven by the output shaft, a transistor electrically connected to the motor and located in spaced relation axially of the output shaft from the adjacent end of the electric motor, and a thermally conductive agent fixedly bonding the transistor to the housing.

31 Claims, 7 Drawing Figures

OUTBOARD MOTOR WITH SPEED REGULATOR FOR DC PERMANENT MAGNET MOTOR

Matter enclosed in heavy brackets [ ] appears in the original patent but forms no part of this reissue specification; matter printed in italics indicates the additions made by reissue.

RELATED APPLICATIONS

This is a continuation-in-part of Ser. No. 399,609 filed Sept. 21, 1973, and now abandoned.

Reference is hereby made under the provisions of 35 U.S.C. 120 to my earlier applications Ser. No. 399,609 filed Sept. 21, 1973 and now abandoned and Ser. No. 504,353 filed Sept. 9, 1974 *and now abandoned.*

BACKGROUND OF THE INVENTION

The invention relates generally to outboard motors and more particularly to outboard motors including electric motors. Still further, the invention relates to speed control circuits for outboard motors driven by permanent magnet electric motors.

The invention also relates generally to speed control of direct current motors, and more particularly to speed control of permanent magnet direct current motors. In the past, speed regulation of permanent magnet direct current motors was often obtained by employment of a relatively bulky and cost, large wattage variable resistor connected in series with the direct current motor. In operation, variation in the resistance of the resistor changes the motor voltage, and hence, changes the motor speed. It is noted that the current flowing through the motor also flows through the variable resistor.

Attention is directed to the U.S. Ware Pat. No. 3,593,050 issued July 13, 1971 and to the U.S. Green Pat. No. 2,975,349 issued Mar. 14, 1961.

SUMMARY OF THE INVENTION

In accordance with one aspect of the invention, there is provided an outboard motor comprising a shaft extending vertically under normal operating conditions and including a hollow interior, means connected to the shaft for mounting the shaft to a boat hull, a lower housing fixedly connected to the shaft and including a hollow interior, an electric motor mounted in the housing hollow interior and including an output shaft, a propeller driven by the output shaft, a transistor electrically connected to the motor and located in the housing hollow interior in spaced relation axially of the output shaft from the adjacent end of the electric motor, and a thermally conductive means fixedly bonding the transistor to the housing.

In accordance with a preferred embodiment of the invention, the thermally conductive means comprises an epoxy cement and the transistor is embedded in the cement with the transistor and the cement being in spaced relation from the adjacent end of the electric motor so as thereby to provide an air space therebetween.

In accordance with another aspect of the invention, there is also provided a speed control circuit comprising a source of direct current having positive and negative terminals, a permanent magnet motor including an armature winding electrically connected between the positive and negative terminals, a first transistor having a collector and an emitter electrically connected in series with the armature winding between the positive and negative terminals, which first transistor also includes a base, a second transistor connected in parallel with the first transistor and having a collector and an emitter electrically connected in series with the armatutre winding between the positive and negative terminals, which second transistor includes a base, and a potentiometer electrically connected to the negative terminal and directly electrically connected to the bases of the first and second transistors.

In further accordance with a preferred embodiment of the invention, the transistors are preferably germanium transistors. Direct electrical connection of the transistor bases to the potentiometer affords continuous current flow at a steady level through the motor and transistors at any given motor loading and potentiometer setting.

Thus, speed regulation of a permanent magnet direct current motor is provided by controlling the bias of the voltage drop between the transistor emitter and collector by reason of operation of the potentiometer which passes a relatively small current, but is nevertheless operative to control the relatively large current which passes through the direct current motor and through the transistor.

In accordance with still another aspect of the invention, there is provided a speed control circuit for a permanent magnet, direct current motor comprising a source of direct current having positive and negative terminals, a permanent magnet motor including an armature winding electrically connected between the positive and negative terminals, a transistor having a collector and an emitter electrically connected in series with the armature winding between the positive and negative terminals, which transistor also includes a base, a resistor connected between the emitter and the base, and a potentiometer electrically connected between the base and the negative terminal.

One of the principal features of the invention is the provision of an outboard motor which includes a permanent magnet electric motor and a speed control circuit including one or more transistors located in an underwater housing in spaced relation from the electric motor and separated from the electric motor by a partition extending in spaced relation from the transistors and between the transistors and the electric motor.

Still another of the principal features of the invention is the provision of an outboard motor which includes a permanent magnet electric motor and a speed control circuit including one or more transistors located in an underwater housing in spaced relation axially from one end of the electric motor and separated from the motor by an air space.

Another of the principal features of the invention is to regulate the speed of a permanent magnet, direct current motor by controlling a current which is relatively small as compared to the current flowing through the motor.

Still another of the principal features of the invention is the provision of a speed control for a permanent magnet, direct current motor in which motor hum is reduced.

Still another of the principal features of the invention is the provision of a speed control circuit including a pair of transistors arranged in parallel.

Still another of the principal features of the invention is the provision of a speed control for a permanent magnet, direct current motor which is of relatively simple construction, which is relatively small in size, which is economical to construct, and which will provide reliable service over a large and useful life.

Other features and advantages of the embodiments of the invention will become known by reference to the following drawings, general description, and claims.

THE DRAWINGS

Figure 1:
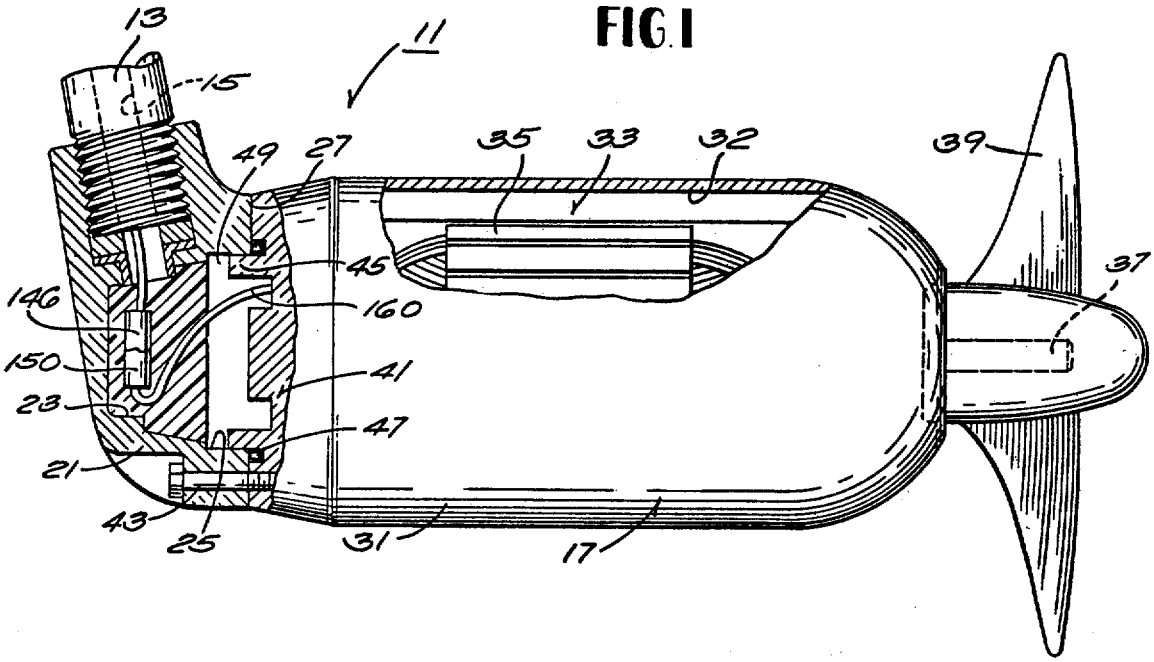
FIG. 1 is a fragmentary side elevational view, partially broken away and in section, of an outboard motor which embodies a permanent magnet direct current motor and which incorporates various of the features of the invention.

Before explaining the embodiments of the invention in detail, it is to be understood that the invention is not limited in its application to the details of construction and the arrangement of the components set forth in the following description or illustrated in the drawings. The invention is capable of other embodiments and of being practiced and carried out in various ways. Also it is to be understood that the phraseology and terminology employed herein is for the purpose of description and should not be regarded as limiting.

GENERAL DESCRIPTION

Shown in FIG. 1 of the drawings is an outboard motor 11 which includes a shaft 13 having a hollow interior 15 and which is carried for steering movement about an axis extending lengthwise of the shaft 13 under normal operating conditions and for tilting movement about a horiozontal axis by any suitable means such as disclosed in the U.S. Shimanckas Application, Ser. No. 381,602 filed July 23, 1973 and now U.S. Pat. No. 3,870,258, and incorporated herein by reference.

At its lower end, the shaft 13 is suitably connected, as by a screw thread connection or otherwise, to an underwater housing 17 which includes an adapter housing member 21 having a rearwardly open cavity or recess 23 communicating with the hollow interior 15 of the shaft 13. The recess 23 includes a rearwardly open counterbore 25 and the adapter housing member 21 includes a rearwardly facing surface 27 extending from the outer or rearward end of the counterbore 25.

Connected to the rearward surface 27 of the adapter housing member 21 is a motor housing member 31 including a hollow interior cavity or chamber 32 containing and supporting a direct current motor 33 which, preferably, is a permanent magnet motor and which includes an armature winding 35. The motor 33 also includes an output shaft 37 which can extend rearwardly from the motor housing member 31 and can have a propeller 39 mounted thereon for rotation in common with the output shaft 37. The motor housing member 31 also includes, forwardly of the electric motor 33, a transverse wall or partition 41 which separates the recess 23 from the cavity 32. The motor housing member 31 can be connected to the adapter housing member 21 in any suitable fashion, and, in the disclosed construction, is connected by a plurality of bolts 43 which extend through portions of the adapter housing member 21 and are threaded into the motor housing member 31.

The counterbore 25 serves as a pilot and, preferably, the motor housing member 31 includes a pilot projection 45 which is received in the pilot counterbore 25 to properly locate the motor housing member 31 relative to the adapter housing member 21. A seal 47 in the form of an O-ring is also provided to prevent entry of water into the adapter recess or cavity 23 or into the chamber or cavity 32 of the motor housing member 31. Contained in the adapter recess or cavity 23 is a portion of a motor control circuit such as shown in FIGS. 2 through 7.

Figure 2:
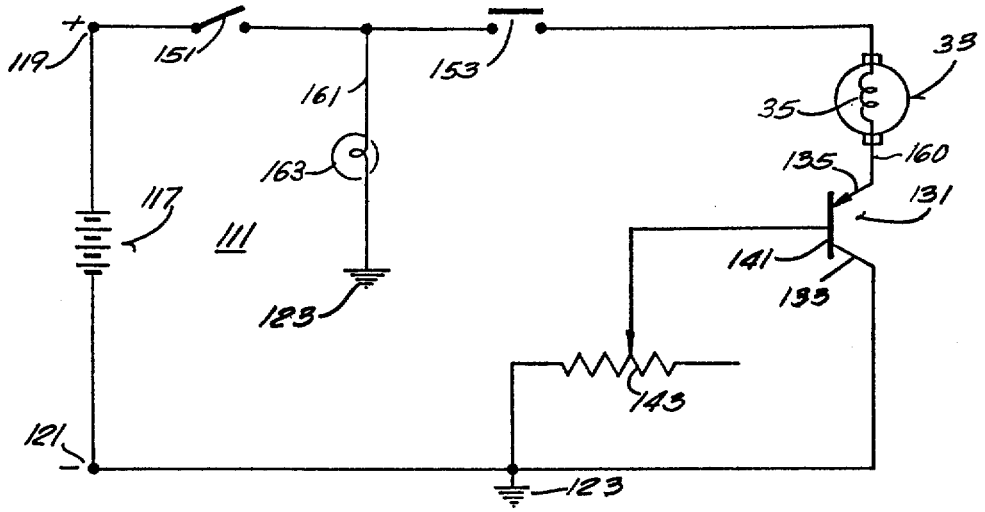
FIG. 2 is a wiring diagram of a speed control circuit for a permanent magnet, direct current motor, which circuit embodies various of the features of the invention and can be incorporated in the outboard motor shown in FIG. 1.

Shown in FIG. 2 is a wiring diagram of one embodiment of a speed control circuit 111 for the permanent magnet, direct current motor 33 including the armature winding 35. The armature winding 35 is connected to any suitable source of a direct current, as for instance a battery 117, including a positive terminal 119 and a negative terminal 121 which is preferably grounded, as indicated at 123. As used herein, negative terminal and ground are interchangeable.

Control of the speed of the direct current motor 33 is provided by a transistor 131 having a collector 133 and an emitter 135 connected between the positive and negative terminals 119 and 121, respectively, in series with the armature winding 35. Preferably, the transistor 131 is of the germanium type. In the specifically disclosed construction, the emitter 135 is electrically connected to the armature winding 35 and the collector 133 is electrically connected to the negative terminal 121 of the battery 117 or other direct current source.

Means are provided to adjust the bias or conductivity of the transistor 131, and, in this regard, the transistor 131 includes a base 141 which is electrically connected to a potentiometer 143 which, in turn, is connected to the negative terminal 121 of the battery 117 or other direct current source. Alternatively, the potentiometer 143 could be directly grounded. Accordingly, variation in the setting of the potentiometer 143 serves to vary the bias or impedance of the transistor 131 and thereby to control the speed of the motor 33 under a given load.

Because the potentiometer 143 is directly connected to the transistor base 141 without intervening components, the potentiometer 143 thereby directly and immediately controls the bias of the transistor 131 and the transistor accordingly conducts continuously and at a steady rate for a given potentiometer setting and under constant motor load conditions. Furthermore, the current which is directly controlled by the potentiometer 143 is relatively small as compared to the current which flows through the motor 33 and to the collector 133 from the emitter 135 of the transistor 131.

In addition to the speed control just described, means are provided in the circuit 111 for controlling energizing of or electrical connection of the motor 33 to the direct current source 117, including a master switch 151 and a motor control switch 153. In the illustrated circuit 111, the master switch 151 is connected to the positive terminal 119 of the battery 117 or other direct current source, and the motor control switch 153 is connected in series between the master switch 151 and the armature winding 115. Both switches 151 and 153 must be closed to obtain motor operation, and opening of either switch prevents motor operation.

Means are also provided for determining the availability of direct current from the battery 117 or other source. In the illustrated construction, such means comprises an indicating sub-circuit 161 which is connected to the master switch 151 in common with the connection of the motor control switch 153, and which includes an indicator in the form of a lamp 163 which is also connected to ground 123 but could alternatively be connected to the negative terminal 121 of the battery 117 or other direct current source. Accordingly, when there is energy available at the battery 117 and when the master switch 151 is closed, the lamp 163 will light, independently of the open or closed position of the motor control switch 153, to thereby indicate such availability of electrical energy.

Figure 3:
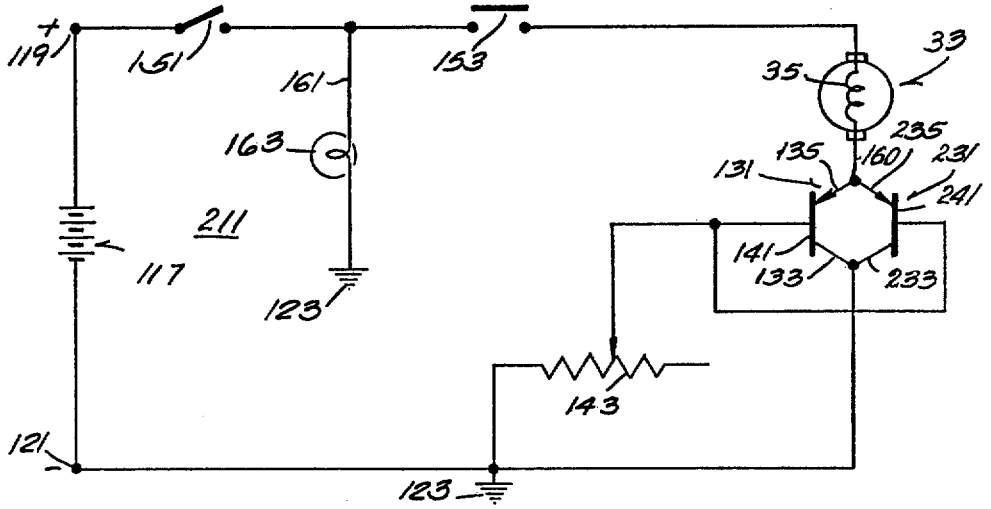
FIG. 3 is a wiring diagram of a second embodiment of a speed control circuit for a permanent magnet, direct current motor, which circuit embodies various of the features of the invention and can be incorporated in the outboard motor shown in FIG. 1.

In the event the current controlling capacity of the transistor 131 is insufficient to afford full range speed control of the motor 33, one or more additional transistors can be connected in parallel with the transistor 131, as shown in the circuit 211 illustrated in FIG. 3. Specifically, the circuit 211 is substantially identical to the circuit 111 shown in FIG. 2 except there is additionally provided a second transistor 231 including an emitter 235 connected to the armature winding 35 in common with connection of the emitter 135, a collector 233 connected to the negative terminal 121 in common with the collector 133, and a base 241 connected directly to the potentiometer 143 in common with the base 141. If desired, two separate and independently adjustable potentiometers, one for each transistor base, could be employed.

Figure 4:
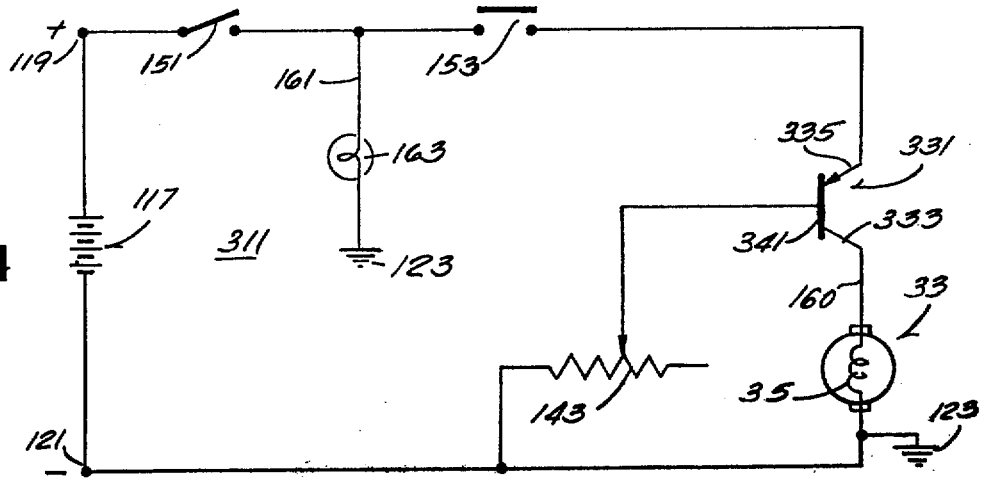
FIG. 4 is a wiring diagram of a third embodiment of a speed control circuit for a permanent magnet, direct current motor, which circuit embodies various of the features of the invention and can be incorporated in the outboard motor shown in FIG. 1.

Shown in FIG. 4 is still another circuit 311 in accordance with the invention in which a transistor 331 is located in series with the armature winding 35 between the armature winding 35 and the positive terminal 119. In FIG. 4, the transistor emitter 335 is connected to the positive terminal 119, the collector 333 is connected to the armature winding 35, and the base 341 is connected to the potentiometer 143. Otherwise, and except for omission of the transistor 131, the construction shown in FIG. 4 is the same as that shown in FIG. 2.

Figure 5:
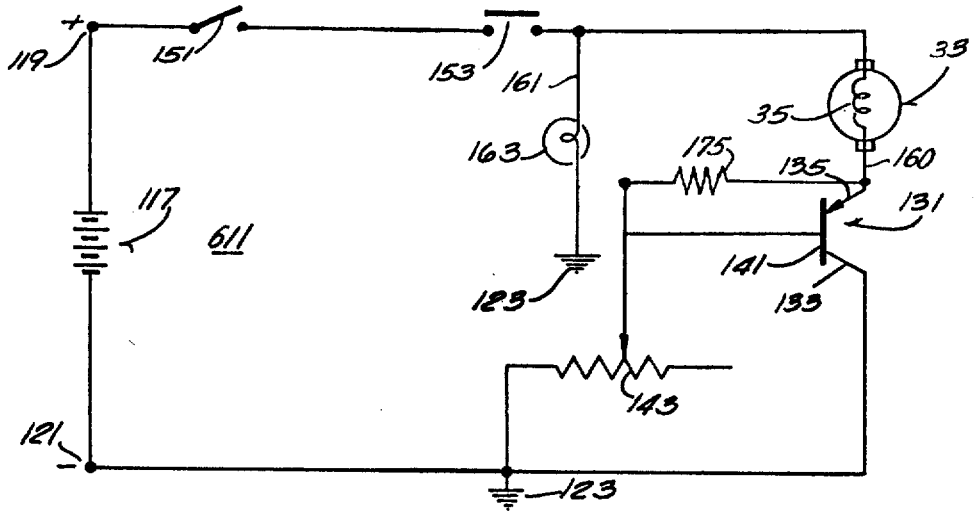
FIG. 5 is a wiring diagram of a fourth embodiment of a speed control circuit for a permanent magnet, direct current motor, which circuit embodies various of the features of the invention and can be incorporated in the outboard motor shown in FIG. 1.

Shown in FIG. 5 is another control circuit 611 which is identical to the control circuit 111 shown in FIG. 2 except that the lead 161 extending from the light 163 is connected between the switch 153 and the motor 33 so that the light 163 will be energized to indicate motor operation as compared to the availability of battery power as provided in the circuit 111 shown in FIG. 2.

In addition, the circuit 611 differs from the circuit 111 by addition of a resistor 175 which is connected between the emitter 135 and the potentiometer 143 and which provides stability in the biasing of the transister 131. As shown, the resistor 175 can also be considered as being connected between the emitter 135 and the base 141.

Figure 6:
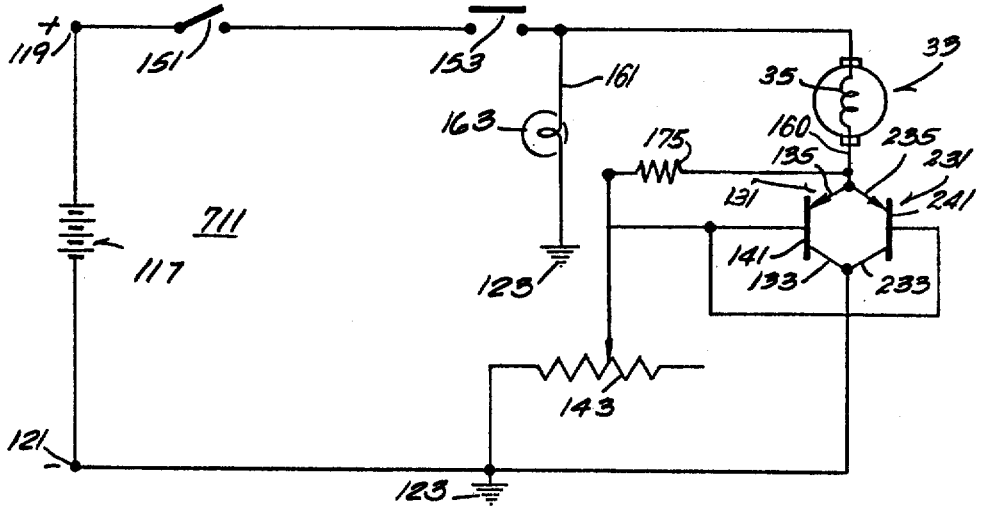
FIG. 6 is a wiring diagram of a fifth embodiment of a speed control circuit for a permanent magnet, direct current motor, which circuit embodies various of the features of the invention and can be incorporated in the outboard motor shown in FIG. 1.

Shown in FIG. 6 is another control circuit 711 which is identical to the circuit 211 shown in FIG. 3 except that the light 163 is connected in the same manner as in the circuit 611 and except for addition of the resistor 175 which is arranged in the same general manner as in the circuit 611. The resistor 175 serves to provide stability in the biasing of both transistors 131 and 231.

Figure 7:
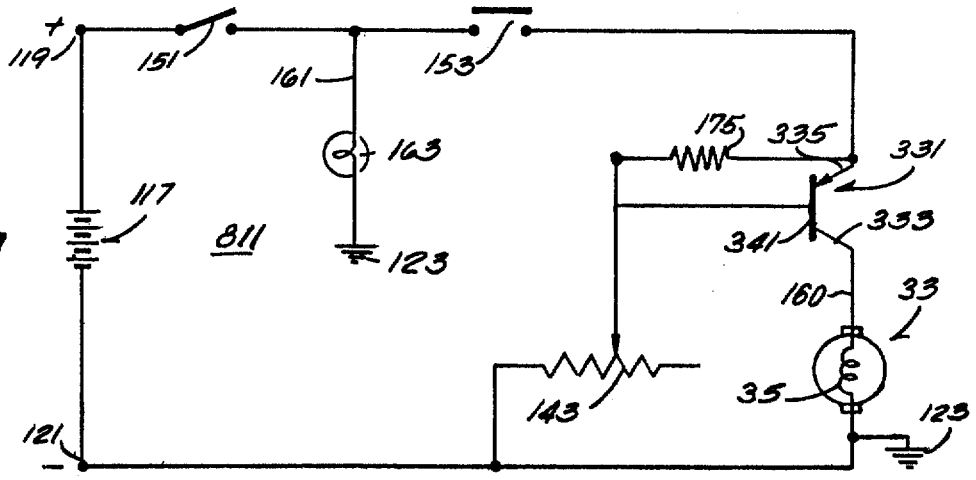
FIG. 7 is a wiring diagram of a sixth embodiment of a speed control circuit for a permanent magnet, direct current motor, which circuit embodies various of the features of the invention and can be incorporated in the outboard motor shown in FIG. 1.

Shown in FIG. 7 is still another control circuit 811 which is identical to the control circuit 511 shown in FIG. 4 except that a resistor 175 is connected between the emitter 335 and the potentiometer 143 in order to provide stability in the biasing of the resistor. The resistor 175 could also be described as extending between the emitter 335 and the base 341. If desired, the light 163 provided in the circuit 811 could be connected as in the circuits 611 and 711 shown respectively in FIGS. 5 and 6.

The transistors 131, 231 and 331 are preferably located in the recess or cavity 23 in the housing adapter member 21 and are fixed therein by being embedded in a thermally conductive agent, such as an epoxy cement, which serves to bond the transistors 131, 231 and 331 to the adapter housing member 21, while at the same time, providing for high heat transfer from the transistors 131, 231 and 331 to the adapter housing member 21 and while also electrically insulating the transistors 131, 231 and 331 from the housing adapter member 21. It is noted especially that the heat generated by the transistors 131, 231 and 331 is dissipated to the water through the adapter housing member 21 independently of the motor housing member 31 and that the transistors 131, 231 and 331 are spaced from the partition 41 provided by the motor housing member 31 and from the motor 33 located on the other side of the partition 41 by an air space or void 49 which also acts to thermally insulate the motor 33 from the heat generated by the transistors 131, 231 and 331.

The transistors 131, 231 and 331 are connected to the armature winding 35 by a lead 160 which extends through the partition 41 in an aperture (not shown) which is sealed by a grommet (not shown) or epoxy cement, or otherwise.

When employing the circuits disclosed in the drawings, a relatively small current flowing through the potentiometer 143 serves to control a much larger current flowing through the motor 33 and to the collector from the emitter of the controlling transistor, whereby considerable economies in cost and size can be achieved as compared with use of relatively large wattage, variable resistors for directly controlling motor speeds.

In operation, the master switch 151 and motor control switch 153 are both closed to supply power to the motor. Instantaneously, the motor begins running and current passes through the motor 33 and from the emitter to the collector. The speed of the motor 33 is determined by the setting of the potentiometer 143 and as the potentiometer is varied, the transistor operating point is changed, thereby changing the bias or impedance of the transistor and hence the collector-emitter voltage is increased or decreased. Accordingly, the motor voltage is increased or decreased, respectively, so as to provide regulation of motor speed. When the potentiometer 143 is completely shorted out, i.e., provides no resistance, the resistance of the armature winding 35 limits the bias or voltage drop between the emitter and collector of the transistor.

Various of the features of the invention are set forth in the following claims.

What is claimed is:

1. An outboard motor comprising a shaft extending vertically under normal operating conditions and adapted to be connected to a boat hull, said shaft including a hollow interior, a lower housing fixedly connected to said shaft and including a hollow interior communicating with said hollow interior of said shaft, an electric motor mounted in said housing hollow interior and including an output shaft including a first [and] *end* extending exteriorly of said lower housing and a second end terminating within said hollow interior of said lower housing, a propeller mounted on said first end of said output shaft, a transistor electrically connected to said motor and located in said housing hollow interior in axially spaced relation from said output shaft, and a thermally conductive means fixedly bonding said transistor to said housing.

2. An outboard motor in accordance with claim 1 wherein said thermally conductive means comprises an epoxy cement and wherein said transistor is embedded in said cement with said transistor and said cement being in axially spaced relation from said second end of said output shaft so as thereby to provide an air space between said epoxy cement and said electric motor.

3. An outboard motor in accordance with claim 1 wherein said hollow interior includes first and second chambers separated by a partition, wherein said electric motor is mounted in said first housing chamber, and said transistor is located in said second housing chamber.

4. An outboard motor in accordance with claim 3 wherein said lower housing includes an adapter housing member including said second chamber and a motor housing member connected to said adaptor housing member and including said first chamber.

5. An outboard motor in accordance with claim 3 wherein said second chamber in said [adapter] housing is closed by said partition.

6. An outboard motor in accordance with claim 3 wherein said thermally conductive means comprises an epoxy cement and wherein said transistor is embedded in said cement with said transistor and said cement being in spaced relation from said partition so as thereby to provide an air space therebetween.

7. An outboard motor in accordance with claim 1 wherein said motor is a permanent magnet motor including an armature winding adapted to be electrically connected between the positive and negative terminals of a source of direct current, wherein said transistor includes a collector and an emitter electrically connected in series with said armature winding between the positive and negative terminals, said transistor also including a base, and further including a second transistor connected in parallel with said first mentioned transistor and having a collector and an emitter electrically connected in series with said armature winding between the positive and negative terminals, said second transistor including a base, and further including a potentiometer electrically connected to the negative terminal and directly electrically connected to said bases of said first and second transistors.

8. An outboard motor in accordance with claim 7 wherein said transistors are germanium transistors.

9. An outboard motor in accordance with claim 7 wherein said emitter-base current path is through said armature winding.

10. An outboard motor in accordance with claim 7 and further including a master switch and a control switch electrically connected in series between said positive terminal and said winding and an indicator electrically connected between said master and control swtiches and additionally electrically connected to said negative terminal.

11. An outboard motor in accordance with claim 7 and further including a master switch electrically connected to said positive terminal, a control switch electrically connected between said master switch and said winding, and an indicator electrically connected between said control switch and said winding and additionally electrically connected to said negative terminal.

12. An outboard motor in accordance with claim 7 and further including a resistor connected between said winding and said potentiometer.

13. An outboard motor in accordance with claim 1 wherein said motor is a permanent magnet motor including an armature winding adapted to be electrically connected to the positive terminal of a source of direct current, wherein said first mentioned transistor is a germanium transistor and further including a second germanium transistor arranged in parallel with said first mentioned transistor, said first and second transistors each having an emitter electrically connected to said armature winding, a collector adapted to be electrically connected to the negative terminal of the source of direct current, and a base, and further including a potentiometer directly electrically connected between said bases and the negative terminal, whereby said first and second transistors afford continuous current flow which is substantially uniform during steady load conditions and at any given potentiometer setting.

14. An outboard motor in accordance with claim 13 and further including a master switch and a control switch electrically connected in series between said positive terminal and said winding and an indicator electrically connected between said master and control switches and additionally electrically connected to said negative terminal.

15. An outboard motor in accordance with claim 13 and further including a master switch electrically connected to said positive terminal, a control switch electrically connected between said master switch and said winding, and an indicator electrically connected between said control switch and said winding and additionally electrically connected to said negative terminal.

16. An outboard motor in accordance with claim 13 and further including a resistor connected between said winding and said potentiometer.

17. An outboard motor in accordance with claim 1 wherein said motor is a direct current motor including an armature winding adapted to be electrically connected between the positive and negative terminals of a source of direct current and wherein said transistor includes a collector and an emitter electrically connected in series with said armature winding between the positive and negative terminals, and wherein said transistor also includes a base, and further including a resistor connected between said emitter and said base, and a potentiometer electrically connected between said base and the negative terminal.

18. An outboard motor in accordance with claim 17 wherein said potentiometer is directly connected to said base and said transistor affords continuous current flow which is substantially uniform during steady load conditions and at any given potentiometer setting.

19. An outboard motor in accordance with claim 17 wherein said transistor is a germanium transistor.

20. An outboard motor comprising a shaft extending vertically under normal operating conditions and adapted to be connected to a boat hull, said shaft including a hollow interior, a lower housing fixedly connected to said shaft and including an adapter member and a housing member connected to said adapter member and defining an interior cavity including a partition dividing said cavity into a first chamber located in said adapter member and communicating with said hollow interior of said shaft, and a second chamber located in said housing member, an electric motor mounted in said second chamber and including an output shaft including a first end extending exteriorly of said housing member and a second end terminating in said second chamber to one side of said partition, a propeller mounted on said first end of said output shaft, a motor control circuit including a transistor electrically connected to said motor and located in said first chamber on the other side of said partition, and a thermally conductive means fixedly bonding said transistor to said housing.

21. An outboard motor in accordance with claim 20 wherein said thermally conductive means comprises an epoxy cement and wherein said transistor is embedded in said cement with said transistor and said cement being in spaced relation from said partition so as thereby a provide an air space between said epoxy cement and said partition.

22. An outboard motor in accordance with claim 20 wherein said first chamber in said adapter housing is closed by said partition.

*23. An outboard motor comprising a shaft extending vertically under normal operating conditions and adapted to be connected to a boat hull, said shaft including a hollow interior, a lower housing fixedly connected to said shaft and including a hollow interior communicating with said hollow interior of said shaft, an electric motor mounted in said housing hollow interior and including an output shaft including a first end extending exteriorly of said lower housing and a second end terminating within said hollow interior of said lower housing, a propeller mounted on said first end of said output shaft, a control circuit for said motor including a heat generating electrical component electrically connected to said motor and located in said housing hollow interior in axially spaced relation from said output shaft, and a thermally conductive means fixedly bonding said heat generating electrical component to said housing.*

*24. An outboard motor in accordance with claim 23 wherein said thermally conductive means comprises an epoxy cement and wherein said heat generating electrical component is embedded in said cement with said heat generating electrical component and said cement being in spaced relation from said second end of said output shaft so as thereby to provide an air space between said epoxy cement and said electric motor.*

*25. An outboard motor in accordance with claim 23 wherein said hollow interior includes first and second chambers separated by a partition, wherein said electric motor is mounted in said first housing chamber, and wherein said heat generating electrical component is located in said second housing chamber.*

*26. An outboard motor in accordance with claim 25 wherein said lower housing includes an adaptor housing member including said second chamber and a motor housing member connected to said adaptor housing member and including said first chamber.*

*27. An outboard motor in accordance with claim 26 wherein said first chamber in said housing is closed by said partition.*

*28. An outboard motor in accordance with claim 25 wherein said second chamber in said housing is closed by said partition.*

*29. An outboard motor comprising a shaft extending vertically under normal operating conditions and adapted to be connected to a boat hull, said shaft including a hollow interior, a lower housing fixedly connected to said shaft and including an adapter member and a housing member connected to said adapter member and defining an interior cavity including a partition dividing said cavity into a first chamber located in said adapter member and communicating with said hollow interior of said shaft, and a second chamber located in said housing member, an electric motor mounted in said second chamber and including an output shaft including a first end extending exteriorly of said housing member and a second end terminating in said second chamber to one side of said partition, a propeller mounted on said first end of said output shaft, a motor control circuit including a heat generating electrical component electrically connected to said motor and located in said first chamber on the other side of said partition, and a thermally conductive means fixedly bonding said heat generating electrical component to said housing.*

*30. An outboard motor in accordance with claim 29 wherein said thermally conductive means comprises an epoxy cement and wherein said heat generating electrical component is embedded in said cement with said heat generating electrical component and said cement being in spaced relation from said partition so as thereby to provide an air space between said epoxy cement and said partition.*

*31. An outboard motor in accordance with claim 29 wherein said first chamber in said housing is closed by said partition.*

* * * * *